United States Patent
Repp et al.

(10) Patent No.: US 8,755,933 B2
(45) Date of Patent: Jun. 17, 2014

(54) SYSTEMS AND METHODS FOR DISPENSING SOFT GOODS

(71) Applicant: June Tailor, Inc., Richfield, WI (US)

(72) Inventors: Jilene A. Repp, Hartland, WI (US); Francis A. Yogerst, West Bend, WI (US)

(73) Assignee: June Tailor, Inc., Richfield, WI (US)

( * ) Notice: Subject to any disclaimer, the term of this patent is extended or adjusted under 35 U.S.C. 154(b) by 0 days.

(21) Appl. No.: 14/029,575

(22) Filed: Sep. 17, 2013

(65) Prior Publication Data

US 2014/0081451 A1 Mar. 20, 2014

Related U.S. Application Data

(60) Provisional application No. 61/702,633, filed on Sep. 18, 2012.

(51) Int. Cl.
*B65H 26/06* (2006.01)
*G06F 17/00* (2006.01)

(52) U.S. Cl.
USPC ......... 700/236; 242/563; 242/563.2; 700/240

(58) Field of Classification Search
USPC .......... 700/233, 236, 237, 240, 242; 242/563, 242/563.2
See application file for complete search history.

(56) References Cited

U.S. PATENT DOCUMENTS

| | | | | |
|---|---|---|---|---|
| 4,084,467 | A * | 4/1978 | Schwarz | 242/563.2 |
| 5,487,010 | A * | 1/1996 | Drake et al. | 700/233 |
| 5,997,236 | A * | 12/1999 | Picioccio et al. | 221/197 |
| 6,328,245 | B1 * | 12/2001 | Kastfelt et al. | 242/563.2 |
| 6,343,491 | B1 | 2/2002 | Jung | |
| 6,473,666 | B1 * | 10/2002 | Samura | 700/233 |
| 2004/0060264 | A1 | 4/2004 | Miller | |
| 2004/0128025 | A1 | 7/2004 | Deal | |
| 2006/0217836 | A1 | 9/2006 | Poliner | |

FOREIGN PATENT DOCUMENTS

KR 1020030070298 8/2003

OTHER PUBLICATIONS

International Search Report and Written Opinion for International Application No. PCT/US2013/060073, dated Dec. 20, 2013, 13 pages.

* cited by examiner

*Primary Examiner* — Timothy Waggoner
(74) *Attorney, Agent, or Firm* — Foley & Lardner LLP

(57) ABSTRACT

Systems and methods for dispensing soft goods are provided. A described method includes receiving a soft good supply at a loading zone of a soft good dispensing device, receiving an indication of a desired quantity of the soft good at a processing circuit of the soft good dispensing device, using a dispensing mechanism of the soft good dispensing device to automatically dispense the desired quantity of the soft good from the soft good supply based on a control signal received from the processing circuit, and providing a dispensed quantity of the soft good to a dispensing zone of the soft good dispensing device for user access.

20 Claims, 12 Drawing Sheets

SYSTEMS AND METHODS FOR DISPENSING SOFT GOODS

CROSS-REFERENCE TO RELATED PATENT APPLICATIONS

This application claims the benefit of and priority to U.S. Provisional Patent Application No. 61/702,633 filed Sep. 18, 2012, the entirety of which is incorporated by reference herein.

FIELD

The present disclosure relates generally to systems and methods for dispensing (e.g., measuring, cutting, separating, etc.) soft goods such as fabric, lace, foam, canvas, felt, and other consumer materials that are dispensed in smaller quantities from a relatively larger supply. The present disclosure relates more particularly to a user-operable device for automatically dispensing a particular quantity of a soft good (e.g., a "fabric cutting kiosk") and a method for operating the same.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Many retail stores sell fabric or other soft goods (e.g., lace, foam, canvas, felt, etc.) which are typically merchandised in large quantities. For example, soft goods may be maintained by the retail stores in the form of a bolt, roll, spool, or other configuration for efficiently storing and displaying many different soft goods in a limited retail space. Conventional systems for dispensing soft goods typically require a customer (e.g., at a retail store or other similar outlet) to bring the bolt or reel of the soft good to a service counter where store personnel assist the customer. The store personnel typically measure-out the customer's desired quantity of the soft good and then manually cut the desired quantity from the bolt or roll using scissors or other cutting instruments.

Conventional systems for dispensing soft goods suffer from several disadvantages. Customers are often forced to wait in a line or other queuing system (e.g., "take-a-number," etc.) until store personnel are available to assist the customer in manually measuring and cutting the soft good from the bolt or roll. Store personnel generally provide customers with more than the requested amount of material due to inaccuracies in the manual cutting process. Additionally, conventional systems for dispensing soft goods typically require large, space-consuming measuring tables that occupy a significant portion of the retail space. It would be desirable to provide an improved system and method for dispensing soft goods that overcomes the disadvantages of conventional systems.

SUMMARY

One implementation of the present disclosure is a method for dispensing a soft good. The method includes receiving a soft good supply at a loading zone of a soft good dispensing device, receiving an indication of a desired quantity of the soft good at a processing circuit of the soft good dispensing device, using a dispensing mechanism of the soft good dispensing device to automatically dispense the desired quantity of the soft good from the soft good supply based on a control signal received from the processing circuit, and providing a dispensed quantity of the soft good to a dispensing zone of the soft good dispensing device for user access.

In some embodiments, the soft good includes at least one of fabric, lace, trim, ribbon, cording, elastic, foam, batting, stitching cloth, interfacing, plastic, vinyl, fur, felt, fleece, and fusible web. In some embodiments, receiving the soft good supply includes receiving a bulk supply of the soft good within the loading zone and automatically feeding the soft good into the dispensing mechanism from the bulk supply.

In some embodiments, automatically dispensing the desired quantity of the soft good includes operating a drive motor system of the dispensing mechanism to unwind the soft good from a bulk supply, measuring an amount of the soft good unwound from the bulk supply, and providing a measurement signal to the processing circuit. The measurement signal may be representative of the measured amount of the soft good.

In some embodiments, automatically dispensing the desired quantity of the soft good includes receiving, at the processing circuit, a measurement signal indicating a measured amount of the soft good unwound from a bulk supply; comparing, by the processing circuit, the measured amount of the soft good with the desired quantity of the soft good; and generating, by the processing circuit, a control signal for the dispensing mechanism based on a result of the comparison.

In some embodiments, automatically dispensing the desired quantity of the soft good includes using an automated cutting device of the dispensing mechanism to separate the desired quantity of the soft good from a bulk supply in response to a determination, by the processing circuit, that the dispensing mechanism has unwound the desired quantity from the bulk supply.

In some embodiments, the method further includes receiving payment information from a user via at least one of: a user interface of the soft good dispensing device and an input/output device of the soft good dispensing device. The method may further include conducting electronic data communications with a payment processing system to facilitate payment for the dispensed quantity of the soft good.

In some embodiments, the method further includes conducting electronic data communications with an inventory system to automatically update an amount of the soft good in an inventory database. Updating the amount of the soft good may include subtracting the dispensed quantity of the soft good from a previously-recorded amount in the inventory database. In various embodiments, updating the inventory database may be performed by the soft good dispensing device and/or at the point of sale (e.g., at check-out).

Another implementation of the present disclosure is a system for dispensing a soft good. The system includes a processing circuit configured to receive an indication of a desired quantity of a soft good and a dispensing mechanism configured to receive a soft good supply. The dispensing mechanism is configured to automatically dispense the desired quantity of the soft good based on a control signal received from the processing circuit. In some embodiments, the system further includes a user interface configured to present information to a user and to receive a user selection of the desired quantity of the soft good.

In some embodiments, the system further includes a loading zone configured to receive a bulk supply of the soft good therein. The dispensing mechanism may be configured to automatically feed the soft good from the bulk supply within the loading zone.

In some embodiments, the dispensing mechanism includes a drive motor system configured to unwind the soft good from a bulk supply and a measurement device configured to measure an amount of the soft good unwound from the bulk supply and to provide a measurement signal to the processing circuit. The measurement signal may indicate the measured amount of the soft good.

In some embodiments, the processing circuit is configured to receive a measurement signal indicating a measured amount of the soft good unwound from a bulk supply, compare the measured amount of the soft good with the desired quantity of the soft good, and generate a control signal for the dispensing mechanism based on a result of the comparison.

In some embodiments, the processing circuit is configured to determine whether the dispensing mechanism has unwound the desired quantity of the soft good from the bulk supply and to provide a control signal to the dispensing mechanism based on a result of the determination. In some embodiments, the dispensing mechanism includes an automated cutting device configured to separate the desired quantity of the soft good from the bulk supply upon receiving a control signal from the processing circuit.

In some embodiments, the system further includes one or more devices configured to receive payment information and to provide the payment information to the processing circuit. The one or more devices may include at least one of a user interface and an input/output device. In some embodiments, the system further includes a data communications interface configured to conduct electronic data communications with a payment processing system to facilitate payment for the dispensed quantity of the soft good.

In some embodiments, the system further includes a data communications interface configured to conduct electronic data communications with an inventory system to automatically update an amount of the soft good in an inventory database. Updating the amount of the soft good may include subtracting the dispensed quantity of the soft good from a previously-recorded amount in the inventory database.

Yet another implementation of the present disclosure is a user-operable dispensing device for dispensing a desired quantity of a material from a larger bulk supply. The dispensing device includes a loading zone configured to receive a bulk supply of the material therein, a user interface configured to receive a user selection of the desired quantity of the material, a drive motor system configured to unwind the material from the bulk supply, a measurement device configured to measure an amount of the material unwound from the bulk supply, a cutting device configured to separate the desired quantity of the material from the bulk supply, and a dispensing zone configured to receive a dispensed quantity of the material separated from the bulk supply and to provide the dispensed quantity of the material to a user.

In some embodiments, the dispensing device further includes a processing circuit configured to compare the desired quantity of the material with the measured amount of the material unwound from the bulk supply and to control the drive motor system based on a result of the comparison.

In some embodiments, the dispensing device further includes a data communications interface configured to conduct electronic data communications with at least one of: a payment processing system to facilitate payment for the dispensed quantity of the material and an inventory system to automatically update an amount of the material in an inventory database Updating the amount of the material may include subtracting the dispensed quantity of the material from a previously-recorded amount in the inventory database.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, systems and methods for dispensing soft goods are shown, according to various exemplary embodiments. Soft goods encompass a wide variety of consumer materials including, for example, fabric, lace, trim, ribbon, cording, elastic, foam, batting, stitching cloth (e.g., needlework canvas, aida cloth for cross-stitching, etc.), interfacing, flexible polymers (e.g., plastics), fur, felt, fleece, fusible web, textiles, woven, and non-woven materials. Dispensing a soft good may include one or more actions related to obtaining a relatively smaller quantity of the soft good from a relatively larger quantity or supply. For example, dispensing a soft good may include unwinding or unwrapping the soft good from a bolt, spool, or roll; measuring or weighing a desired quantity of the soft good; and/or separating the desired quantity of the soft good from the supply or source (e.g., cutting, tearing, shearing, etc.) such that the desired quantity can be transported and/or purchased separate from the supply. The systems and methods described herein may be used to automatically or semi-automatically dispense a desired quantity of a soft good or other suitable material.

Before discussing further details of the soft good dispensing system and/or the components thereof, it should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

Figure 1:
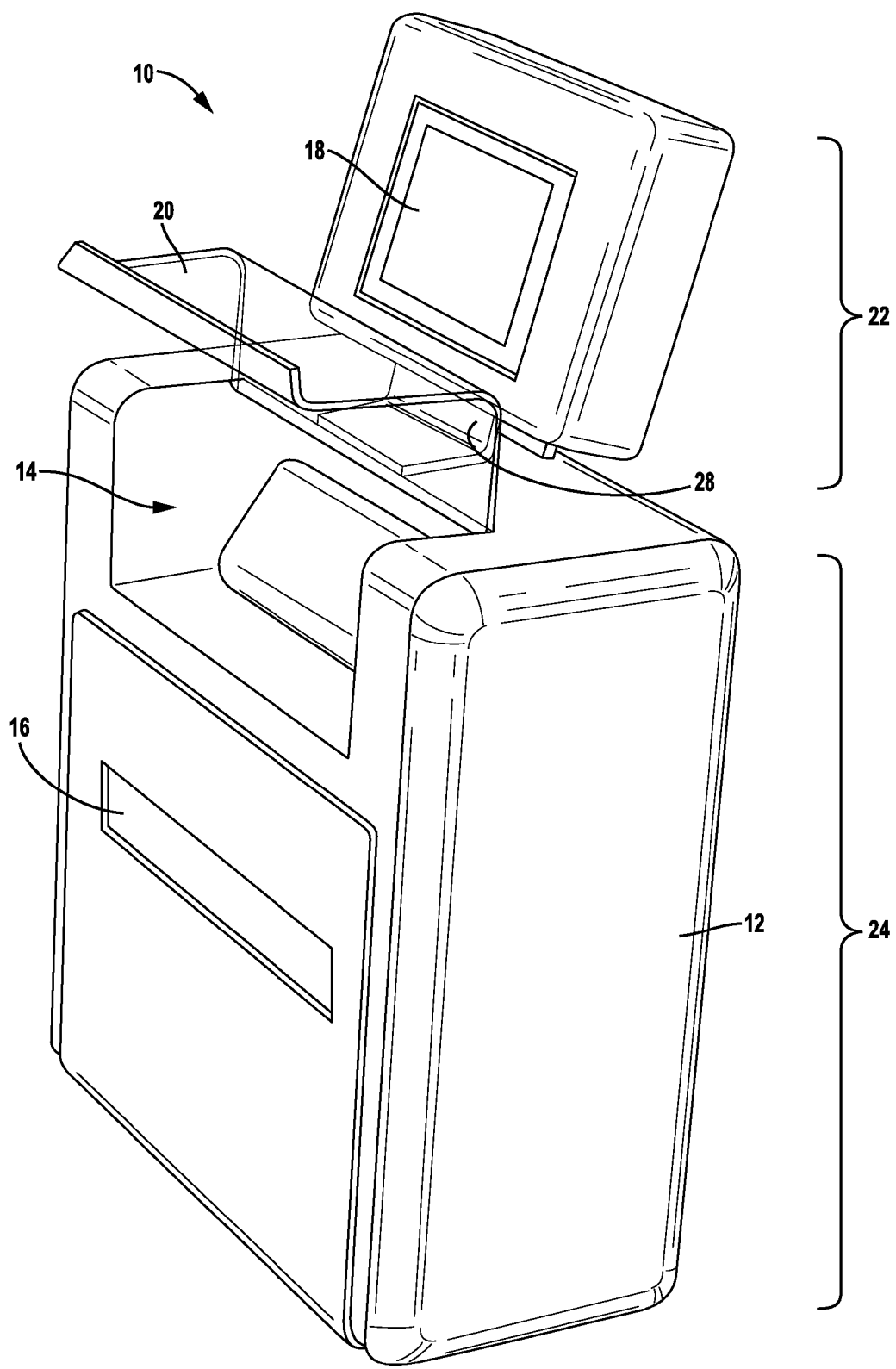
FIG. 1 is a front perspective drawing of a soft good dispensing device, according to an exemplary embodiment.

Referring now to FIG. 1, a drawing of soft good dispensing device 10 is shown, according to an exemplary embodiment. Dispensing device 10 is configured to receive a supply of a soft good (e.g., in the form of a bolt, roll, spool, reel, feed, etc.) and to dispense a desired quantity of the soft good to a user. Dispensing device 10 may be implemented, for example, in a retail store, supply distribution center, warehouse, textile manufacturing facility, or other location at which soft goods are sold, handled, distributed, or separated into smaller quantities.

In some embodiments, dispensing device 10 may be referred to as a "fabric cutting kiosk." For example, dispensing device 10 may be physically separate from other structures or devices in its immediate surroundings (as shown in FIG. 1). In other embodiments, dispensing device 10 may be recessed into a wall or pillar, incorporated into a counter or shelving system, or otherwise physically integrated with its immediate environment. Dispensing device 10 may be configured to dispense a wide variety of soft goods (i.e., in addition to or in place of fabrics) and may take a variety of forms in addition to a kiosk.

Still referring to FIG. 1, dispensing device 10 is shown to include a housing 12, a loading zone 14, a dispensing zone 16, and a user interface 18. Housing 12 may be a shell or casing within which various electronic and/or mechanical components of dispensing device 10 are contained. Housing 12 may form a protective barrier around the internal components of dispensing device 10 and may provide a rigid or substantially rigid structure for mounting or positioning the internal components. In some embodiments, housing 12 is a hexahedral casing having one or more filleted edges or corners.

In some embodiments, housing 12 includes multiple sections. For example, housing 12 is shown to include an upper section 22 and a lower section 24. As shown in FIG. 1, upper section 22 may house user interface 18 and/or other electronic components (e.g., a credit card reader, a wired or wireless transceiver, etc.). Lower section 24 may house various mechanical or electromechanical components configured to automatically measure, cut, and dispense a desired quantity of a soft good. In other embodiments, housing 12 does not include multiple sections. For example, user interface 18 may be integrated with lower section 24 or otherwise located such that upper section 22 is not necessary. Housing 12 may include one or more internal panels or walls dividing the volume within housing 12 into multiple compartments (e.g., isolated compartments, interconnected compartments, etc.) and physically separating loading zone 14 from dispensing zone 16.

Still referring to FIG. 1, dispensing device 10 is shown to include a loading zone 14. Loading zone 14 may be configured to receive a supply of a soft good. For example, a user (e.g., a customer at a retail store, store personnel, etc.) may place a bolt, roll, spool, or other relatively large quantity of a soft good into loading zone 14. In FIG. 1, loading zone 14 is shown with a bolt 26 of a soft good contained therein. In other embodiments, loading zone 14 may receive a feed of a soft good from a supply external to dispensing device 10. Loading zone 14 may be configured to receive soft goods having various widths.

In some embodiments, loading zone 14 facilitates rotation of the soft good supply contained therein. For example, loading zone 14 may include a belt, roller, rotating central axle, or other device configured to cause rotation of bolt 26. As bolt 26 rotates, the soft good may unwind or unwrap from bolt 26. In some embodiments, loading zone 14 is configured to maintain the soft good supply in a dispensing position. For example, loading zone 14 may secure bolt 26 in a rotatable position such that the soft good can unwind or unwrap therefrom while preventing bolt 26 from slipping, sliding, or otherwise moving or rotating in an undesirable direction.

In some embodiments, loading zone 14 includes a scale for measuring a weight of bolt 26. The weight of bolt 26 may be used to determine a total quantity of material on bolt 26 prior to the beginning of the cutting process (e.g., total linear distance of material, total area of material, total volume of material, etc.). Dispensing device 10 may be configured to convert the measured weight of bolt 26 into a total quantity of material using a conversion formula, chart, lookup table, or other conversion process. For example, dispensing device 10 may subtract the weight of an empty bolt from the measured weight to determine a total weight of the soft good on bolt 26. Dispensing device 10 may divide the total weight of the soft good by various metrics (e.g., material density, weight per unit area, weight per unit length, etc.) to determine the total quantity of material on bolt 26. The various metrics may be material properties specific to the particular soft good on bolt 26.

In some embodiments, dispensing device 10 includes a door 20. Door 20 may be a hingedly connected or sliding panel covering an opening in housing 12. Door 20 may be opened to permit access to loading zone 14 (e.g., for loading or unloading a soft good supply) and closed to prevent access to loading zone 14 (e.g., while dispensing a soft good or other operation of dispensing device 10). In some embodiments, dispensing device 10 may be configured to dispense a soft good only when door 20 is closed, thereby ensuring user safety throughout the dispensing process.

Still referring to FIG. 1, dispensing device 10 is shown to include a dispensing zone 16. Dispensing zone 16 may be a compartment within housing 12 into which a desired quantity of the soft good is deposited for user access (e.g., when dispensing is completed). Dispensing device 10 may automatically measure, cut, and provide the desired quantity of the soft good to dispensing zone 16. Upon completion of the dispensing process, a user can retrieve the desired quantity of the soft good from dispensing zone 16.

Still referring to FIG. 1, dispensing device 10 is shown to include a user interface 18. User interface 18 may include an electronic display and/or other user interface devices (e.g., a keyboard, a button panel, etc.) for presenting information to a user and receiving inputs from a user during operation of dispensing device 10. The display may be an LCD (liquid crystal display), TFT (thin film transistor), LED (light-emitting diode), or any other appropriate technology for a display. In some embodiments, the display is a touch-sensitive display that can generate signals when certain areas of the display are touched by a user. In some embodiments, user interface 18 is attached to dispensing device 10 (e.g., embedded into housing 12, attached via a coupling bracket 28, etc.). In other embodiments, user interface 18 may be placed in a variety of other locations to provide convenience to the user.

User interface 18 may display a price, description, quantity, total amount, product details, or other data related to a particular soft good selected for dispensing by a user. In some implementations, the data displayed via user interface 18 may include specific information related to the user. The specific information may be based upon the purchasing history of the user or other useful information related to the user (e.g. suggested quantities, complementary products, etc.). For example, user interface 18 may provide a coupon to the user based on the frequency of the user's purchasing. In some embodiments, dispensing device 10 may be configured to receive specific information related to the user by accessing a database.

User interface 18 may be configured to receive user input. For example, a user may input item information such as an item identifier (e.g., UPC, product number, etc.) and a desired quantity of the soft good. In some implementations, a user may indicate the preferred method of payment (e.g., cash, credit card, debit card, gift card, etc.) via user interface 18. For example, the user may touch an icon on a touch-sensitive display or press a corresponding button to indicate the preferred method of payment. User interface 18 may be configured to prompt the user for a signature and receive a signature from the user (e.g., if a purchase is made via a credit card or other form of payment that requires a signature). User interface 18 may present visual data (e.g., video data, image data, etc.) as well as other types of data (e.g., sound data) to the user.

Figure 2:
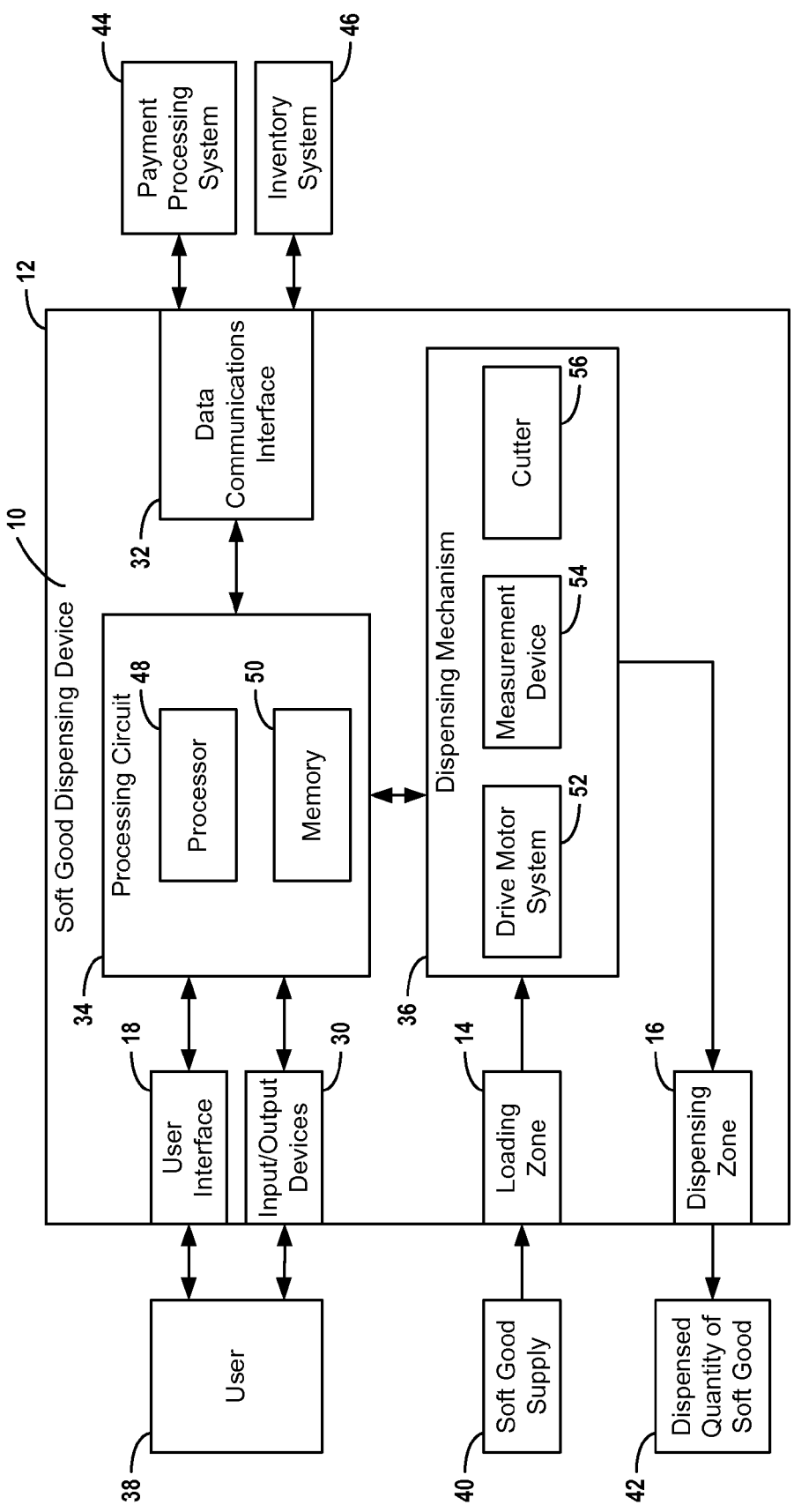
FIG. 2 is a schematic diagram of the soft good dispensing device of FIG. 1 showing a dispensing mechanism configured to unwind, measure, and cut a desired quantity of a soft good from a soft good supply and a processing circuit configured to control the dispensing mechanism, according to an exemplary embodiment.

Referring now to FIG. 2, a schematic diagram of dispensing device 10 is shown, according to an exemplary embodiment. In some embodiments, dispensing device 10 includes one or more components in addition to the components illustrated in FIG. 1. For example, dispensing device 10 is shown to include input/output devices 30, a data communications interface 32, a processing circuit 34, and a dispensing mechanism 36.

Input/output devices 30 may include one or more systems or devices configured to facilitate user interaction with dispensing system 10. For example, input/output devices 30 may include a scanner, camera, or other input device configured to read or store an item code (e.g., a bar code, a UPC, company symbol, alphanumeric character, a QR code, etc.) or another identifier related to the item to be purchased. In some embodiments, input/output devices 30 include a card reader. The card reader may be configured to read and interpret data from a credit card, debit card, gift card, customer card, RFID card, memory card, or other portable data storage devices. User 38 may use input/output devices 30 to quickly and easily input information without having to manually enter the information via user interface 18.

In some embodiments, input/output devices 30 include a printer for providing information in a portable format to user 38. The printer may be used to print a label (e.g., a sticker, a bar code, etc.) or other suitable indicia identifying the type and quantity of soft good dispensed. For embodiments in which direct purchase of the dispensed quantity 42 is not performed directly by dispensing device 10, the output of the printer may be attached to dispensed quantity 42 (e.g., by a user, by dispensing device 10, etc.) for subsequent check-out and purchase at a different location or time.

Still referring to FIG. 2, dispensing device 10 is shown to include a data communications interface 32. Communications interface 32 may include wired or wireless interfaces (e.g., jacks, antennas, transmitters, receivers, transceivers, wire terminals, etc.) for conducting electronic data communications with external systems, devices, or data sources. In some embodiments, data communications interface 32 may be used to communicate with a payment processing system 44 (e.g., a credit card processing system, a bank, an ATM network, a local store network, etc.) to allow a user to pay for the dispensed quantity of the soft good directly at dispensing device 10.

In some embodiments, data communications interface 32 may be used to communicate with an inventory control system 46 to track and/or update the remaining quantity of the dispensed soft good in an inventory database. For example, dispensing device 10 may subtract the dispensed quantity 42 from a previously-recorded quantity in the inventory database upon completion of the dispensing process. In some embodiments, dispensing device 10 may automatically initiate reorder instructions when a predetermined minimum quantity of the dispensed soft good is reached.

Data communications interface 32 may conduct electronic data communications via a direct connection (e.g., a wired connection, an ad-hoc wireless connection, etc.) or a network connection (e.g., an Internet connection, a LAN, WAN, or WLAN connection, etc.). For example, data communications interface 32 can include an Ethernet card and port for sending and receiving data via an Ethernet-based communications link or network. In various embodiments, data communications interface 32 may include a WiFi transceiver, a cellular transceiver, or a mobile phone transceiver for communicating via a wireless communications network.

In some embodiments, dispensing device 10 may be one of a plurality of networked dispensing devices. Data communications interface 32 may be used to monitor the performance of dispensing device 10. For example, dispensing device 10 may collect usage data (e.g., number of dispensing operations performed, quantity and type of soft good dispensed, a user identifier associated with each dispensing process, etc.). Data communications interface 32 may be used to report the usage data and other types of performance data (e.g., diagnostic data, fault detection data, performance metrics, etc.) to one or more remote systems or devices. A retailer can interact with dispensing device 10 remotely via data communications interface 32 to collect usage data and/or otherwise monitor the performance of dispensing device 10 and other networked dispensing devices. In some embodiments, system updates (e.g., firmware updates, operating software updates, soft good attributes, user interface enhancements, etc.) can be downloaded remotely via data communications interface 32.

Still referring to FIG. 2, dispensing device 10 is shown to include a processing circuit 34. Processing circuit 34 may include a processor 48 and memory 50. Processor 48 can be implemented as one or more microprocessors (e.g., CPUs, GPUs, etc.), an application specific integrated circuit (ASIC), one or more field programmable gate arrays (FPGAs), a circuit containing one or more processing components, a group of distributed processing components (e.g., processing components in communication via a data network or bus), circuitry for supporting a microprocessor, or other hardware configured for processing data. Processor 48 may be configured to execute computer code stored in memory 50 to complete and facilitate the activities described herein.

Memory 50 may include one or more devices (e.g., RAM, ROM, solid state memory, hard disk storage, etc.) for storing data and/or computer code for completing or facilitating the various processes, layers, and modules of the present disclosure. Memory 50 may include volatile memory or non-volatile memory. Memory 50 may include database components, object code components, script components, or any other type of information structure for supporting the various activities and information structures of the present disclosure. According to an exemplary embodiment, memory 50 is communicably connected to processor 48 via processing circuit 34 and includes computer code for executing (e.g., by processing circuit 34 and/or processor 48) one or more processes described herein.

Processing circuit 34 may receive and process data signals from user interface 18, input/output devices 30, and/or data communications interface 32. For example, processing circuit 34 may receive data signals from user interface 18 and input/output devices 30 indicating a desired quantity of a particular soft good to be dispensed, a preferred form of payment, and/or payment information (e.g., a credit card number, a customer account number, etc.). Processing circuit 34 may control dispensing mechanism 36 to automatically dispense the desired quantity of the soft good and deliver the dispensed quantity 42 to dispensing zone 16. Processing circuit 34 may send data signals to user interface 18 (e.g., to provide feedback to user 38, to update the display presented via user interface 18, etc.), to input/output devices 30 (e.g., to print a label or bar code), and/or to data communications interface 32 (e.g., to facilitate payment via payment processing system 44, to update inventory system 46, etc.).

Still referring to FIG. 2, dispensing device 10 includes a dispensing mechanism 36. Dispensing mechanism 36 is shown to include a drive motor system 52, a measurement device 54, and a cutter 56. Drive motor system 52 may include a feeding device (e.g. a motor, a belt, a spindle, rollers, gears, etc.) configured to feed and/or receive soft good supply 40. In some embodiments, drive motor system 52 is located at least partially within loading zone 14 and is configured to operate upon a soft good supply contained therein.

In some embodiments, drive motor system 52 receives control signals from processing circuit 34. The control signals provided to drive motor system 52 may cause drive motor system 52 to unwind/unwrap the soft good from supply 40. In some embodiments, drive motor system 52 is configured to operate in both a forward direction (e.g., to unwind/unwrap the soft good from supply 40) and a reverse direction (e.g., to rewind/rewrap the soft good about supply 40). Drive motor system 52 may be used to affect the quantity of the soft good dispensed (e.g., by winding and/or unwinding supply 40). Drive motor system 52 is described in greater detail with reference to FIGS. 3-10.

In some embodiments, dispensing mechanism 36 includes a measurement device 54. Measurement device 54 may include one or more instruments operable to quantify an amount of the soft good fed by drive motor system 52 in order to determine when the desired quantity has been reached. Measurement device 54 may include a weighing device, an optical scanner or other suitable instruments for measuring an amount of the soft good unwound from soft good supply 40. Measurement device 54 may provide a signal representative of the measured amount of the soft good to processing circuit 34.

Processing circuit 34 may use the signal from measurement device 54 to determine a quantity of the soft good that has been fed through drive motor system 52. By comparing the quantity measured by measurement device 54 with the desired quantity received via user interface 18, processing circuit 34 may determine an appropriate control action for drive motor system 52. For example, processing circuit 34 may instruct drive motor system 52 to continue feeding soft good supply 40 until the desired quantity has been reached.

In some embodiments, dispensing mechanism 36 includes a cutter 56. Cutter 56 may include a sharp instrument or other suitable device configured to sever (e.g., separate, detach, remove, cut, etc.) a portion of the soft good from supply 40. In some embodiments, cutter 56 receives control signals from processing circuit 34. Processing circuit 34 may instruct cutter 56 to perform a cutting operation when processing circuit 34 determines that the desired quantity of the soft good has been dispensed (e.g., based on the signals received from measurement device 54). In some embodiments, cutter 56 is coupled to a threaded rod extending the width of drive motor system 52. Rotating the threaded rod may cause cutter 56 to travel longitudinally along the threaded rod, thereby cutting the soft good. Cutter 56 is described in greater detail with reference to FIG. 11.

Referring now to FIGS. 3-8, several half-sectional perspective drawings of soft good dispensing system 10 are shown, according to an exemplary embodiment. FIGS. 3-8 show drive motor system 52 in greater detail and illustrate an exemplary mode of operation of drive motor system 52. Drive motor system 52 is shown to include a rotation guide 58, a conveyor belt 60, and a plurality of rollers 62-68.

Rollers 62 and 64 may function as pulleys for conveyor belt 60 and may be oriented substantially parallel to each other. In some embodiments, rollers 62 and 64 are located in the same horizontal plane and have substantially parallel horizontal axes of rotation. In some embodiments, roller 64 functions as a drive pulley (e.g., a powered pulley driven by a motor or gear system) and roller 64 functions as an idler pulley (e.g., driven by the motion of conveyor belt 60). Rotation of roller 64 may cause a corresponding rotation (e.g., in the same direction) of conveyor belt 60.

Conveyor belt 60 may be a continuous loop of material configured to rotate about rollers 62 and 64. In some embodiments, conveyor belt 60 is a multilayered material. For example, conveyor belt 60 may include an internal layer of material (e.g., to provide linear strength and shape) and an outer layer of material (e.g., to grip or move an object placed on conveyor belt 60). Conveyor belt 60 may cause a soft good supply (shown as a bolt 26 in FIGS. 3-8) to rotate within loading zone 14. In some embodiments, conveyor belt 60 is configured to transport a soft good supply from one end of conveyor belt 60 (e.g., proximate to door 20) toward the other end of conveyor belt 60 (e.g., proximate to rotation guide 58).

Figure 3:
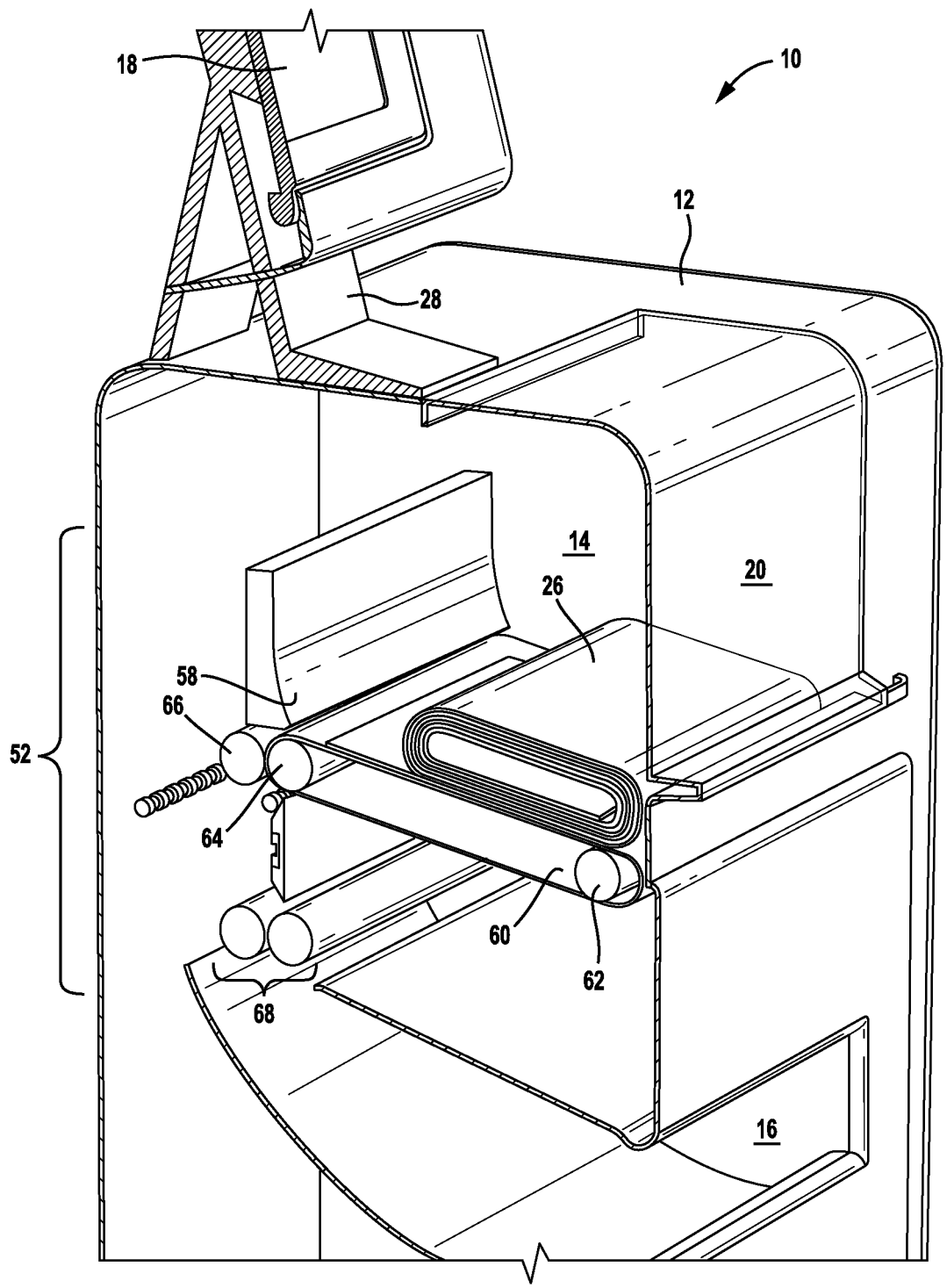
FIGS. 3-8 are half-sectional perspective drawings of the soft good dispensing device of FIG. 1, illustrating the dispensing mechanism in greater detail, according to an exemplary embodiment.

Referring specifically to FIG. 3, bolt 26 or another soft good supply (e.g., a roll, a spool, etc.) may be placed on conveyor belt 60. In some implementations, bolt 26 may be placed such that a free end of the soft good is between conveyor belt 60 and an axis of rotation of bolt 26 (e.g., facing downward, as shown in FIG. 3). Drive motor system 52 may receive a start signal from processing circuit 34 and activate a motor in response to the start signal. The motor may be rotatably coupled with conveyor belt 60 (e.g., via one or both of rollers 62 and 64) such that activation of the motor causes conveyor belt 60 to rotate about rollers 62 and 64. Conveyor belt 60 may cause bolt 26 to move toward rotation guide 58 until an edge of bolt 26 engages rotation guide 58.

Figure 4:
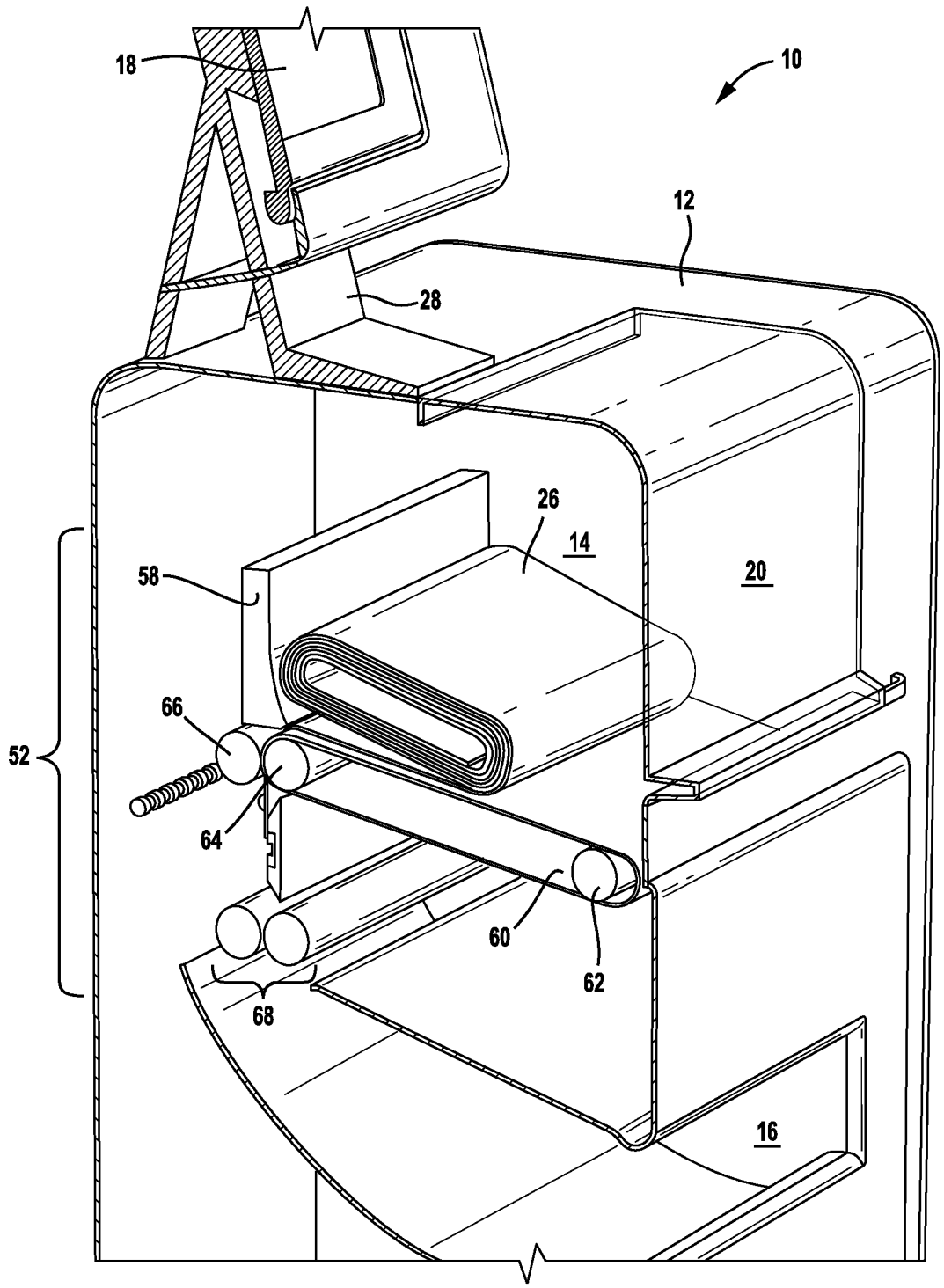
Figure 5:
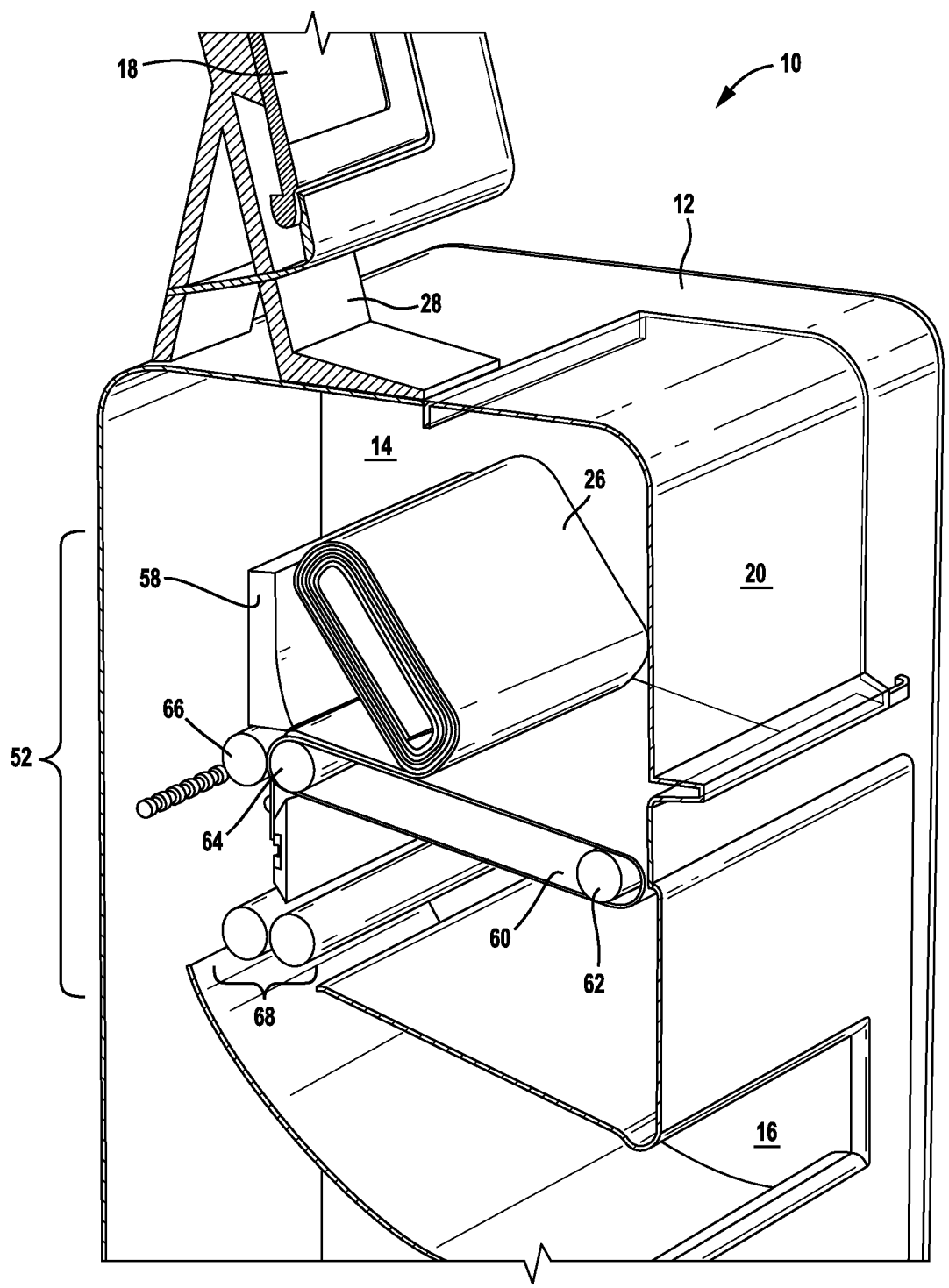

Referring specifically to FIGS. 4-5, bolt 26 is shown engaging rotation guide 58. As bolt 26 approaches rotation guide 58, the free end of the soft good may pass between rollers 64 and 66. Rollers 64 and 66 may grip or clamp the soft good therebetween. Rollers 64 and 66 may be configured to rotate in opposite directions such that rotation of rollers 64 and 66 causes the free end of the soft good to be carried transported through a space between rollers 64 and 66. As shown in FIGS. 4-5, the free end of the soft good may be pulled downward as rollers 64 and 66 rotate in a forward direction.

In some embodiments, drive motor system 52 may be configured to operate in a reverse mode in which some or all of the rotatable components (e.g., rollers 62-68, conveyor belt 60, etc.) rotate in a direction opposite the forward direction. The reverse mode may be useful for causing the soft good to be rewound about bolt 26 (e.g., to reduce an amount of the soft good dispensed, to rewind an extra amount of the soft good after cutting the dispensed quantity 42, etc.).

As bolt 26 engages rotation guide 58, bolt 26 may begin to rotate. As shown in FIGS. 4-5, in some embodiments, rotation guide 58 has an angled or curved surface such that an end of bolt 26 is deflected upward (e.g., away from conveyor belt 60) as conveyor belt 60 continues to rotate. In other embodiments, rotation guide 58 may be a flat surface substantially perpendicular to conveyor belt 60. As the free end of the soft good is transported between rollers 64 and 66, bolt 26 may rotate to allow the soft good to unwind therefrom. The rotation may be caused in part by rotation guide 58 (e.g., by deflecting an edge of bolt 26 upward, by restraining bolt 26 from horizontal translation, etc.). For example, rotation of conveyor belt 60 may cause the lower surface of bolt 26 to move toward rotation guide 58 due to a friction force exerted therebetween. By restraining bolt 26 from continued horizontal translation, rotation guide 58 causes the lower surface of bolt 26 to be moved relative to the center of bolt 26, thereby causing bolt 26 to rotate.

Figure 6:
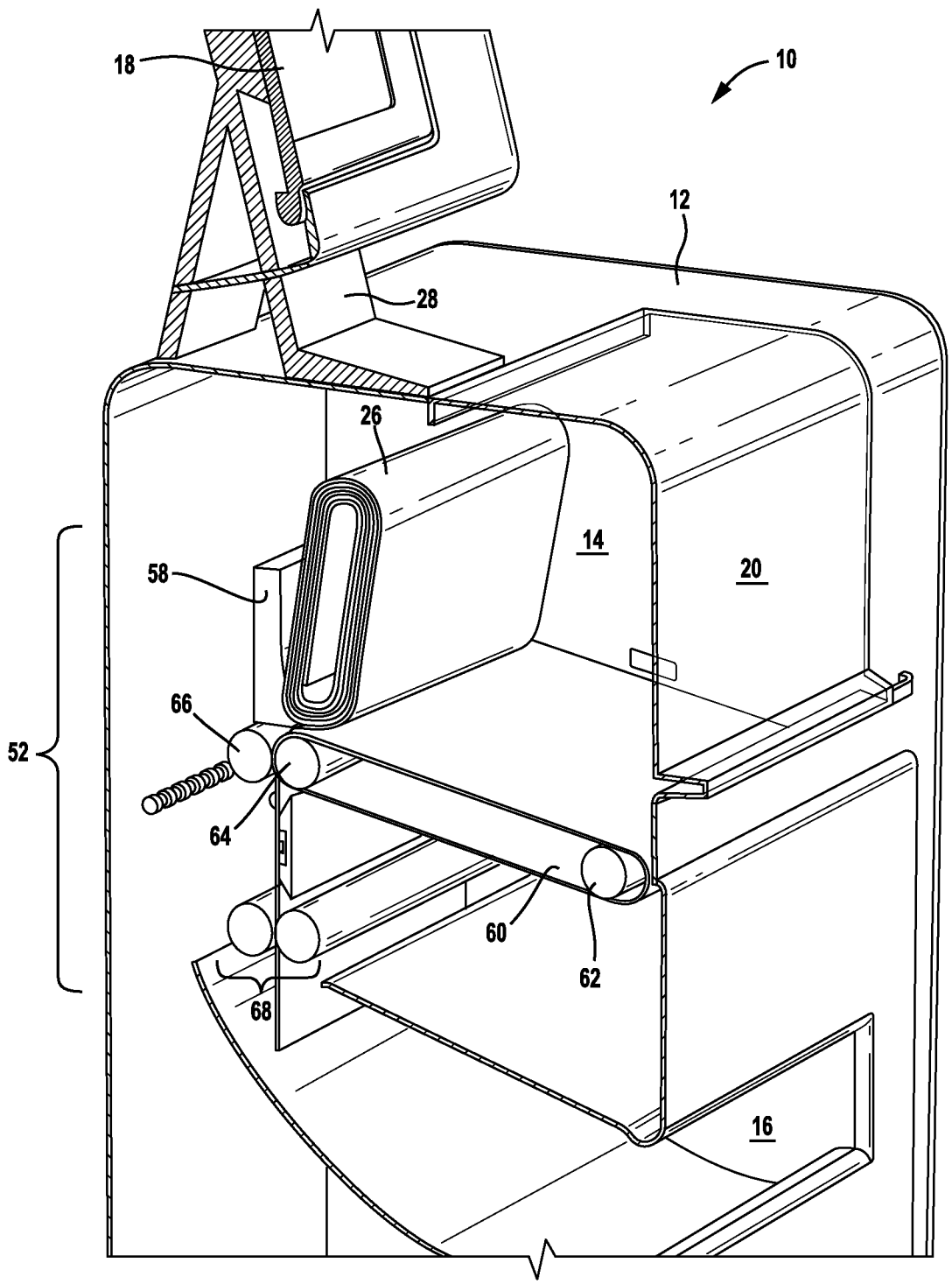
Figure 7:
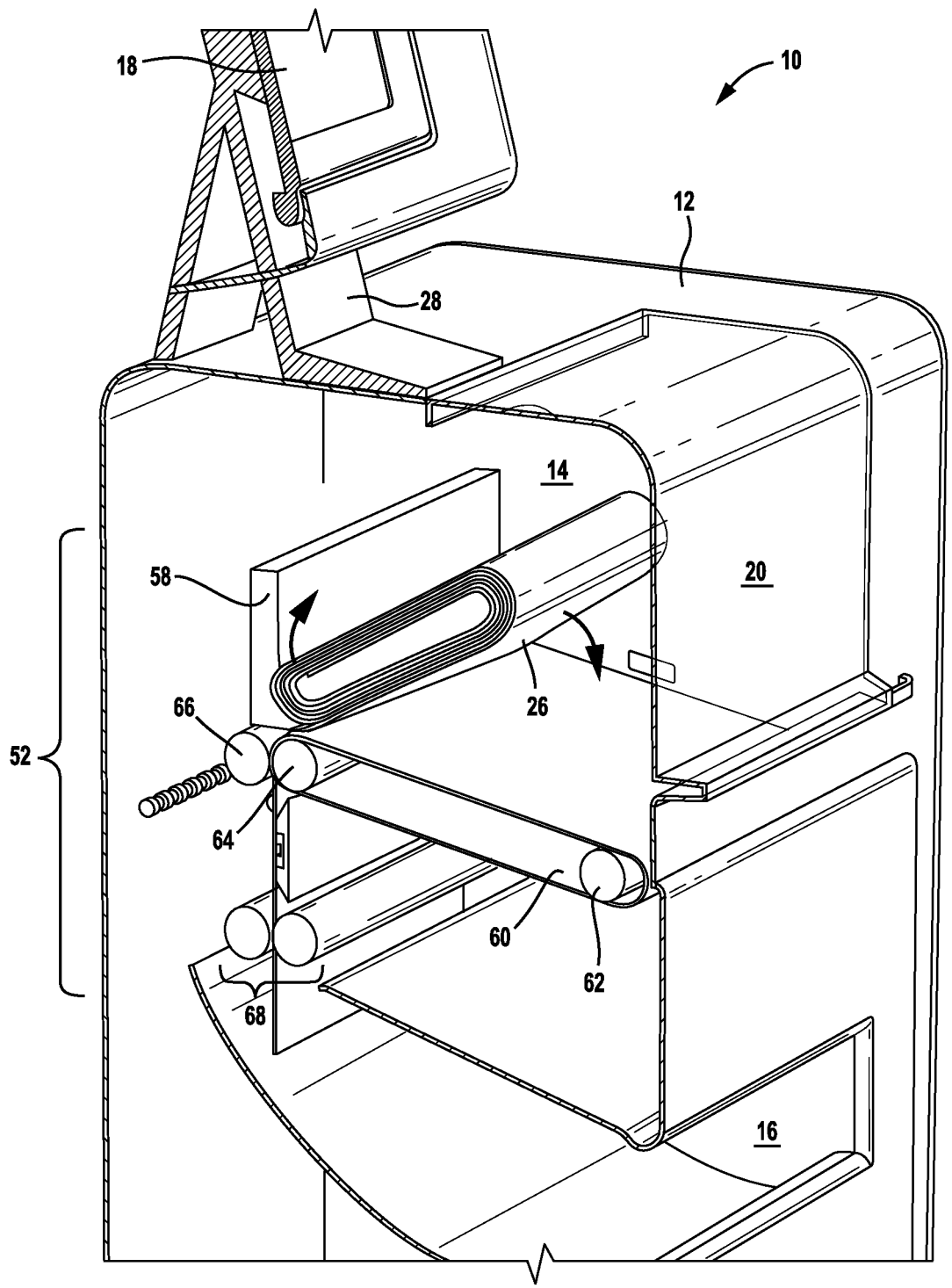
Figure 8:
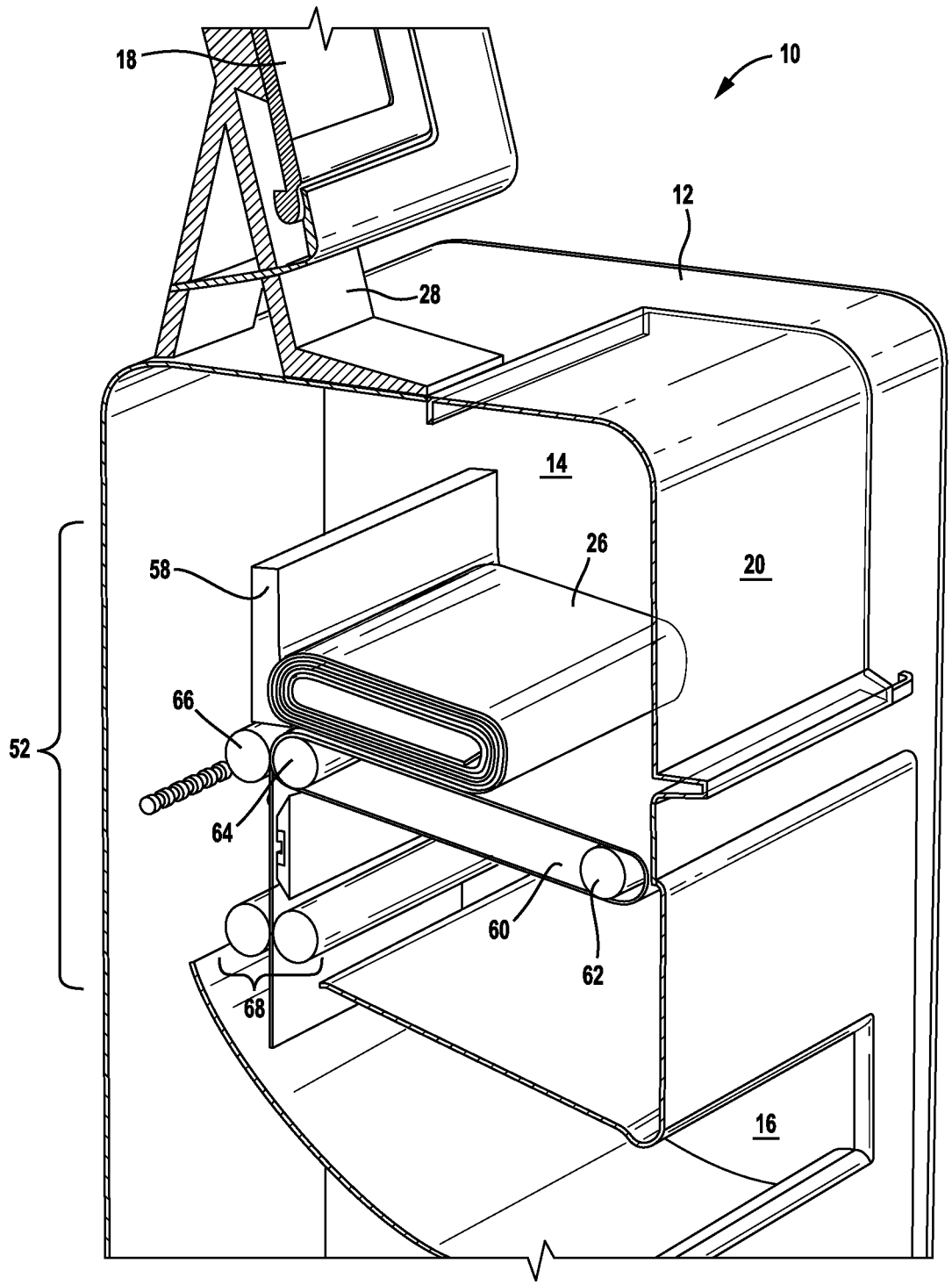

Referring specifically to FIG. 6, as rollers 62-66 and conveyor belt 60 continue to rotate, the free end of the soft good may pass between rollers 68. Rollers 68 may grip or clamp the soft good therebetween. Rollers 68 may be configured to rotate in opposite directions such that rotation of rollers 68 causes the free end of the soft good to be carried transported through a space between rollers 68. As shown in FIG. 6, the free end of the soft good may be pulled downward as rollers 68 rotate in a forward direction Referring specifically to FIGS. 7-8, continued operation of drive motor system 52 may cause the soft good to continue to unwind from bolt 26. Bolt 26 may continue to rotate in a direction opposite the rotation of conveyor belt 60 (as shown in FIG. 7) and return to a neutral position (as shown in FIG. 8). The soft good may continue to unwind from bolt 26 until the desired quantity of the soft good has been unwound. Processing circuit 34 may monitor an amount of the soft good that has been unwound using a measurement signal from measurement device 54. When the desired quantity of the soft good has been unwound, processing circuit 34 may instruct or control drive motor system 52 to stop. The soft good may be held in place by rollers 64-68 while dispensed quantity 42 is cut from bolt 26 (e.g., by cutter 56). In some embodiments, driver motor system 52 may then operate in a the reverse direction to rewind a residual amount of the soft good that remains unwound after the cutting operation is completed.

Figure 9:
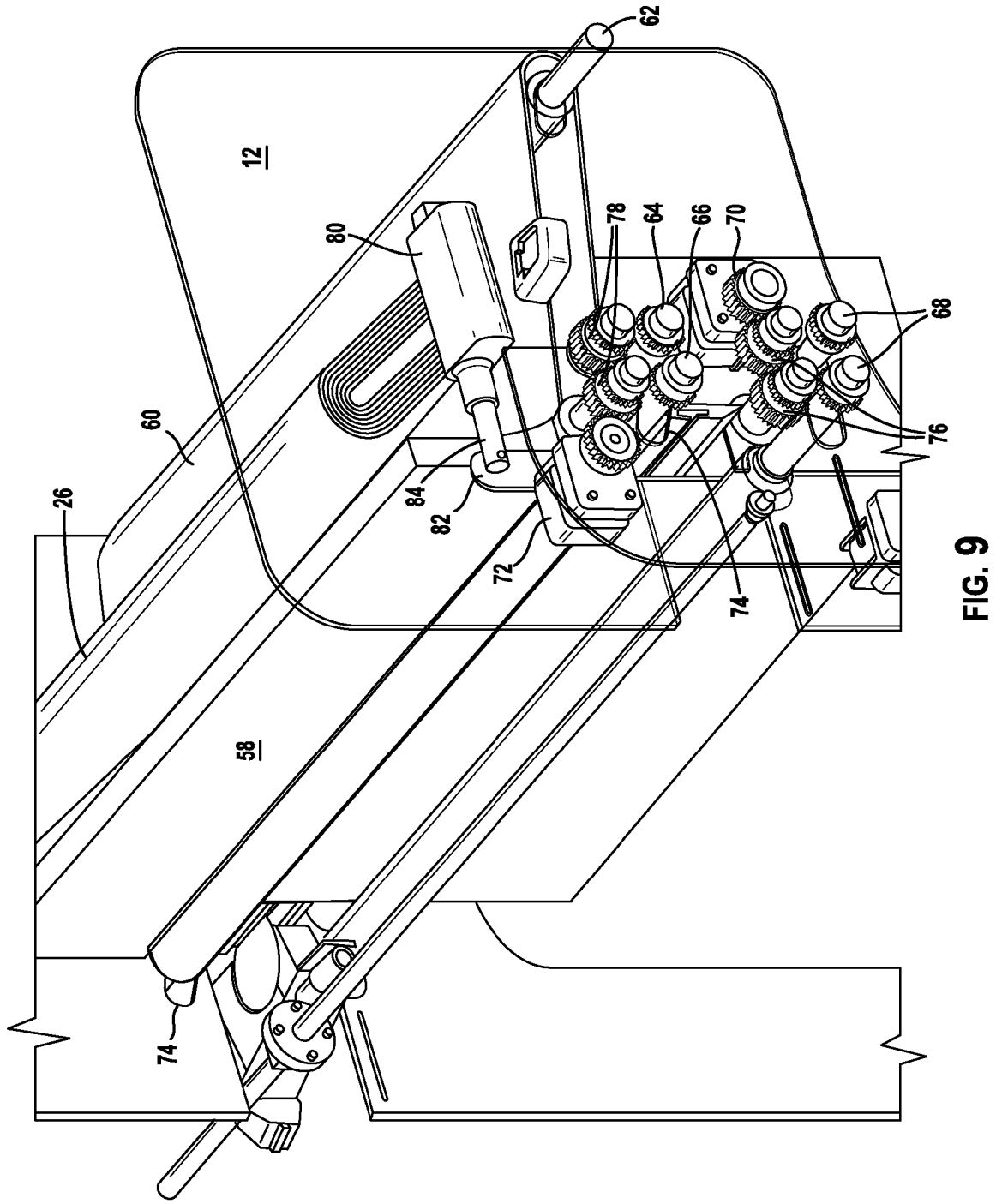
FIGS. 9-10 are rear perspective drawings of the soft good dispensing device of FIG. 1, illustrating the operation of a clamping mechanism configured to facilitate feeding and dispensing of the soft good, according to an exemplary embodiment.
Figure 10:
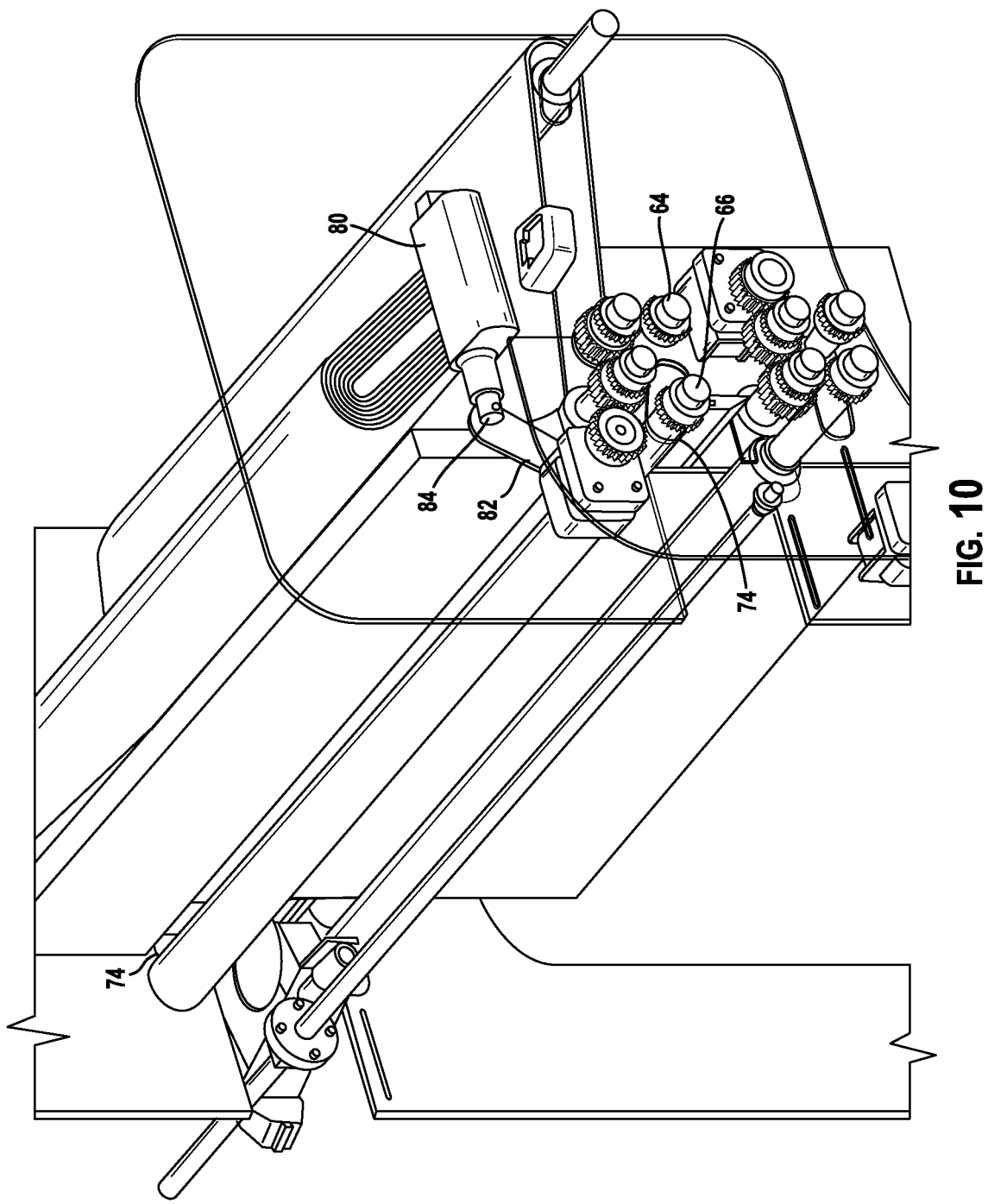
Figure 11:
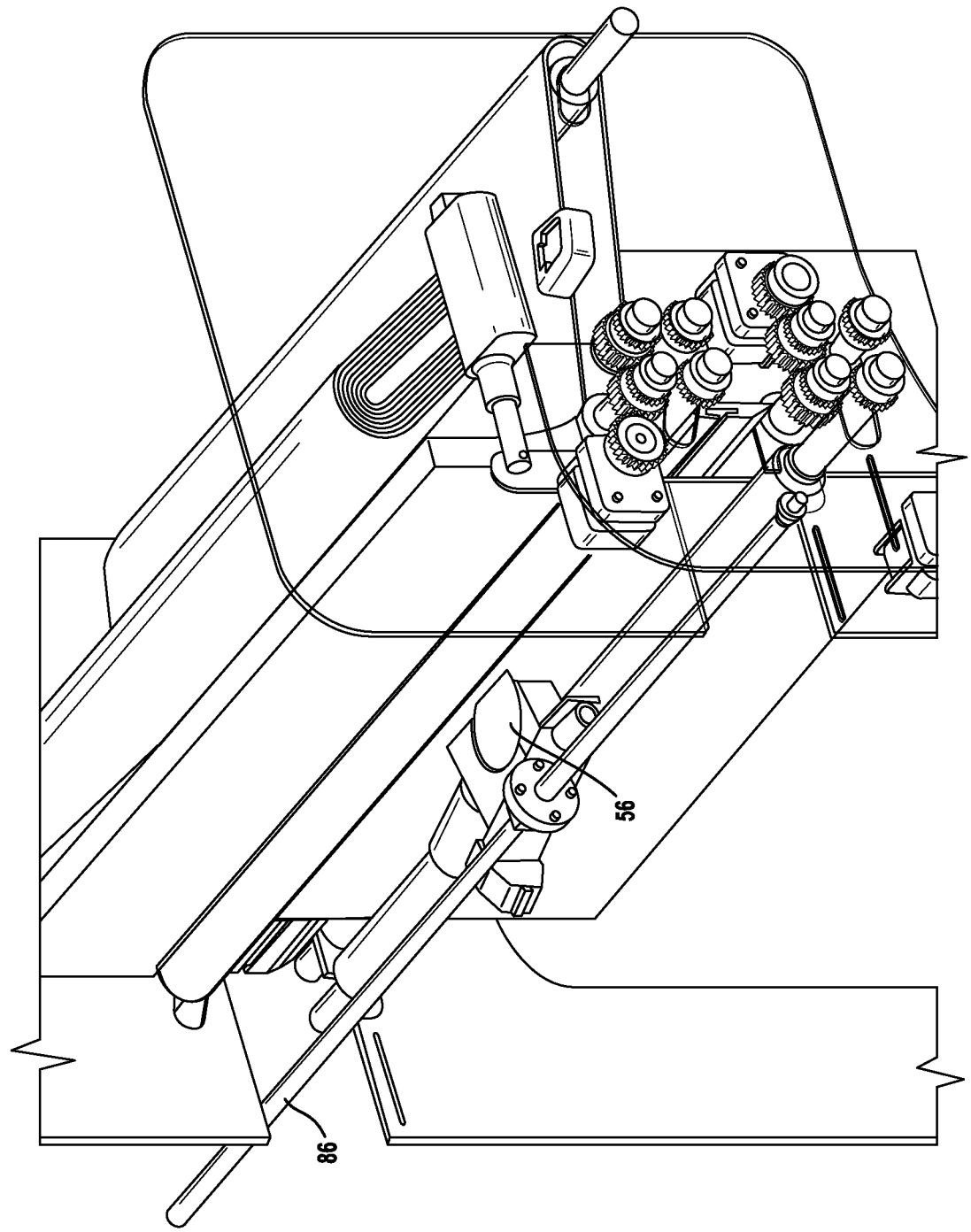
FIG. 11 is a rear perspective drawing of the soft good dispensing device of FIG. 1, illustrating the operation of a cutting mechanism configured to separate the desired quantity of the soft good from the soft good supply, according to an exemplary embodiment.

Referring now to FIGS. 9-11, several rear perspective drawings of soft good dispensing device 10 are shown, according to an exemplary embodiment. FIGS. 9-11 show dispensing device 10 with a portion of housing 12 removed to better illustrate an exemplary configuration of drive motor system 52 and cutter 56.

Referring specifically to FIG. 9, in some embodiments, drive motor system 52 includes one or more motors (e.g., motor 70 and/or motor 72). Motors 70 and 72 may receive control signals from processing circuit 34 and may be configured to operate (e.g., turn on, turn off, increase or decrease a rotational speed, etc.) in response to such control signals. Motors 70 and 72 may be rotatably coupled to rollers 62-68 such that operation of motors 70 and 72 causes rollers 62-68 to rotate. In some embodiments, motor 72 is rotatably coupled to rollers 62-66 and motor 70 is rotatably coupled to rollers 68. Advantageously, two separate motors may allow rollers 62-66 to be operated independently from rollers 68. In other embodiments, a single motor may be rotatably coupled to both sets of rollers (i.e., rollers 62-66 and rollers 68) via a belt or gear system.

In some embodiments, motors 70-72 are rotatably coupled to rollers 62-68 via a system of gears. For example, motor 70 is shown interacting with gears 76 and motor 72 is shown interacting with gears 78. In some embodiments, gears 76 and 78 are intermediary gears. As shown in FIG. 9, gears 76 may be an intermediary between a gear attached to motor 70 and gears attached to rollers 68. Activating motor 70 may impart a torque upon gears 76, which may be transmitted to rollers 68. Similarly, gears 78 may be an intermediary between a gear attached to motor 72 and gears attached to rollers 64-66. Activating motor 72 may impart a torque upon gears 78, which may be transmitted to rollers 64-66. Rotation of roller 64 may cause conveyor belt 60 to rotate, thereby causing a corresponding rotation of roller 62. In other embodiments, gears 76 and 78 are fixed directly to rollers 64-68.

Referring now to FIGS. 9 and 10 together, in some embodiments, drive motor system 52 includes a clamping mechanism 80. Clamping mechanism 80 may be attached to housing 12 or another fixed structure (e.g., fixedly attached, rotatably attached via a pin connection, etc.) and may be configured to transition between a clamped position (shown in FIG. 9) and an open position (shown in FIG. 10). In some embodiments, clamping mechanism 80 includes a piston 84 extending therefrom. Clamping mechanism 80 may receive control signals from processing circuit 34 and may extend and/or retract piston 84 based on the received control signals. Clamping mechanism 80 may use solenoid action, hydraulic action, pneumatic action, or other suitable action to extend and retract piston 84. In some embodiments, piston 84 is extended in the clamped position and retracted in the unclamped position. Piston 84 may be attached to a coupling bracket 82.

Coupling bracket 82 may be rotatably attached to housing 12 or other fixed structure and may be configured to rotate about a stationary axis parallel to rollers 62-68. Coupling bracket 82 may be attached at one end to piston 84, and at the other end to roller 66. In some embodiments, coupling bracket 82 is attached to roller 66 via a rotatable connection (e.g., a sleeve bearing or other suitable connection) such that roller 66 is free to rotate relative to coupling bracket 82.

In some embodiments, roller 66 may be configured to move within a slot 74 in housing 12. As piston 84 is extended and retracted, coupling bracket 82 may rotate, thereby causing roller 66 to move within slot 74. Roller 66 may be configured to move between a clamped position (shown in FIG. 9) and an open position (shown in FIG. 10). When roller 66 is in the open position, the distance between rollers 64 and 66 may be greater than when roller 66 is in the clamped position.

Processing circuit 34 may cause roller 66 to move into the open position (e.g., by instructing clamping mechanism 80 to retract piston 84) when a soft good is initially fed into drive motor system 52. Advantageously, the increased distance between rollers 64 and 66 in the open position may allow the soft good to pass through the space between rollers 64 and 66 more easily. Once the soft good has been fed between rollers 64 and 66, processing circuit 34 may cause roller 66 to move into the clamped position. In the clamped position, the soft good may be held securely between rollers 64 and 66 throughout the dispensing process. Processing circuit 34 may operate motors 70 and 72 to cause rollers 64-68 to rotate and to control the dispensation of the soft good.

Referring now to FIG. 11, cutter 56 is shown in greater detail, according to an exemplary embodiment. Cutter 56 may include a sharp instrument or other suitable device configured to sever (e.g., separate, detach, remove, cut, etc.) a portion of the soft good from soft good supply 40. In some embodiments, cutter 56 receives control signals from processing circuit 34. Processing circuit 34 may instruct cutter 56 to perform a cutting operation when processing circuit 34 determines that the desired quantity of the soft good has been dispensed (e.g., based on the signals received from measurement device 54). In some embodiments, cutter 56 adjusts the cutting operation based on the identity of the soft good being cut. For example, if the soft good is a relatively thick soft good, cutter 56 may perform the cutting operation more slowly or may penetrate the soft good more deeply when performing the cut.

In some embodiments, cutter 56 is attached to a threaded rod 86. Threaded rod 86 may be substantially parallel to rollers 62-68 and may have an axial length at least as long as the width of conveyor belt 60. Cutter 56 may be attached to threaded rod 86 via a threaded connection such that rotation of threaded rod 86 causes cutter 56 to travel longitudinally along threaded rod 86. Threaded rod 86 may be rotated by operation of a motor (e.g., motor 70, motor 72, a different motor, etc.). For example, threaded rod 86 may be rotatably coupled with a motor axle via a geared connection, a belt system, or other suitable connection such that operation of the motor causes threaded rod 86 to rotate. The motor may receive control signals from processing circuit 34 and may be operated based on the received signals.

Processing circuit 34 may cause the motor to activate when the desired quantity of the soft good has been dispensed, thereby causing cutter 56 to travel along threaded rod 86 and to cut dispensed quantity 42 from soft good supply 40. Dispensed quantity 42 may be deposited into dispensing zone 16 for user access.

Figure 12:
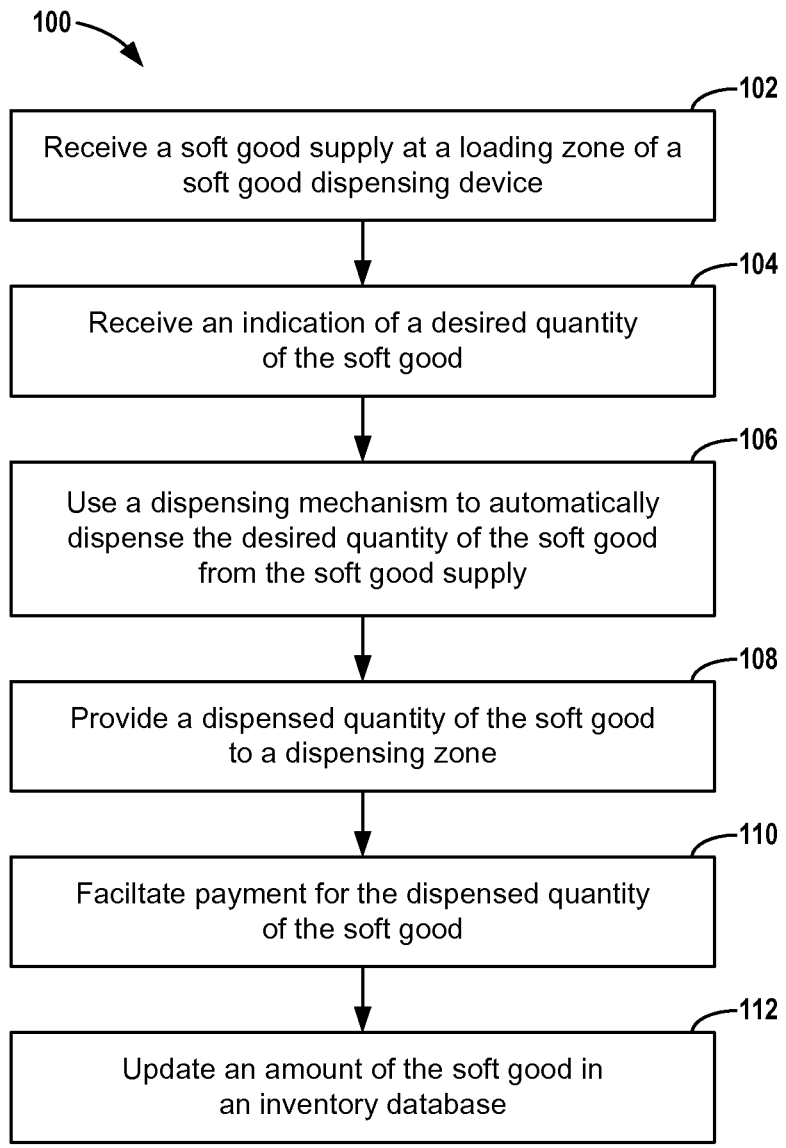
FIG. 12 is a flowchart of a process for dispensing a soft good using a soft good dispensing device, according to an exemplary embodiment.

Referring now to FIG. 12, a flowchart of a process 100 for dispensing a soft good is shown, according to an exemplary embodiment. Process 100 may be performed by soft good dispensing device 10 as previously described with reference to FIGS. 1-11. Process 100 illustrates an exemplary method by which dispensing device 10 may operate to automatically measure, cut, and dispense a desired quantity of a soft good from a bulk supply.

Process 100 is shown to include receiving a soft good supply at a loading zone of a soft good dispensing device (step 102). In some embodiments, receiving a soft good supply includes receiving a bulk supply of the soft good (e.g., in the form of a bolt, roll, spool, reel, etc.) within the loading zone. In other embodiments, receiving a soft good supply includes receiving a feed of a soft good from an externally-located soft good supply (e.g., a supply external to the dispensing zone and/or the soft good dispensing device). Soft goods encompass a wide variety of consumer materials including, for example, fabric, lace, trim, ribbon, cording, elastic, foam, batting, stitching cloth (e.g., needlework canvas, aida cloth for cross-stitching, etc.), interfacing, flexible polymers (e.g., plastics), fur, felt, fleece, fusible web, textiles, woven, and non-woven materials.

In some embodiments, a user (e.g., a customer at a retail store, store personnel, etc.) may place a bolt, roll, spool, or other relatively large quantity of a soft good into the loading zone (e.g., loading zone 14). The loading zone may be configured to receive soft good supplies having various widths, sizes, and shapes (e.g., cylindrical spools, non-cylindrical bolts, boxes or other bulk packages of soft goods, etc.).

In some embodiments, the loading zone facilitates rotation of the soft good supply contained therein. For example, the loading zone may include a belt, roller, rotating central axle, or other device configured to cause rotation of the soft good supply. As the soft good supply rotates, the soft good may unwind or unwrap from the soft good supply. In some embodiments, the loading zone is configured to maintain the soft good supply in a dispensing position. For example, the loading zone may secure the soft good supply in a rotatable position such that the soft good can unwind or unwrap therefrom while preventing the soft good supply from slipping, sliding, or otherwise moving or rotating in an undesirable direction.

Still referring to FIG. 12, process 100 is shown to include receiving an indication of a desired quantity of the soft good (step 104). In some embodiments, a user may input the desired quantity of the soft good via a user interface (e.g., user interface 18). The user interface may include an electronic display and/or other user interface devices (e.g., a keyboard, a button panel, etc.) for presenting information to a user and receiving inputs from a user during operation of the soft good dispensing device. The display may be an LCD (liquid crystal display), TFT (thin film transistor), LED (light-emitting diode), or any other appropriate technology for a display. In some embodiments, the display is a touch-sensitive display that can generate signals when certain areas of the display are touched by a user.

In some embodiments, step 104 includes receiving an input from a user that defines a desired quantity of a particular soft good. For example, the user may input a product identifier (e.g., a product ID number, a bar code number, a name or description of a product, etc.) and an amount of the product that the user wishes to purchase via the user input device. In some embodiments, the product identifier may be input via a supplemental input device (e.g., input/output devices 30) such as a scanner, camera, microphone, card reader, or other input device configured to read or store an item code (e.g., a bar code, a UPC, company symbol, alphanumeric character, a QR code, etc.) or other indication of the desired soft good.

In some embodiments, step 104 includes receiving the desired quantity of the soft good as a numerical amount (e.g., two yards, eighteen square feet, etc.). In other embodiments, step 104 includes receiving other information from which the desired quantity of the soft good can be calculated. For example, step 104 may include prompting the user for information relating to an intended use for the soft good (e.g., garments, clothes, decorative trim, décor, etc.). A processing circuit of the soft good dispensing system (e.g., processing circuit 34) may automatically suggest and/or determine the desired quantity based on the user-supplied information (e.g., by referencing a local or remote database or other information system relating particular uses to desired quantities). For example, the user may specify that the intended use for the soft good is to create a U.S. size six dress. The processing circuit may automatically determine that three yards (or other suitable quantity) of the soft good is needed for the intended use.

In some embodiments, step 104 includes receiving an image or other data associated with the article to be created using the desired quantity of the soft good. For example, a user may upload an image of a dress, curtains, or other articles which can be created from the soft good. The processing circuit may compare the image to a database (e.g., a local database within memory 50, a remote database accessible via data communications interface 32, etc.) to determine the quantity of the soft good needed for the intended article.

Still referring to FIG. 12, process 100 is shown to include using a dispensing mechanism to automatically dispense the desired quantity of the soft good from the soft good supply (step 106). In some embodiments, step 106 includes operating a drive motor system (e.g., drive motor system 52) of the dispensing mechanism to unwind the soft good from a bulk supply. The drive motor system may include a feeding device (e.g. a motor, a belt, a spindle, rollers, gears, etc.) configured to feed and/or receive a soft good supply. In some embodiments, the drive motor system is located at least partially within the loading zone and is configured to operate upon a soft good supply contained therein.

In some embodiments, step 106 includes providing control signals from the processing circuit to the drive motor system. The control signals provided to the drive motor system may cause the drive motor system to unwind/unwrap the soft good from the soft good supply (e.g., by rotating the soft good supply within the dispensing zone). In some embodiments, the drive motor system is configured to operate in both a forward direction (e.g., to unwind/unwrap the soft good from the soft good supply) and a reverse direction (e.g., to rewind/rewrap the soft good about the soft good supply). The drive motor system may be used to affect the quantity of the soft good dispensed by winding and/or unwinding the soft good from the soft good supply.

In some embodiments, step 106 includes using a clamping device to facilitate dispensing the desired quantity of the soft good from the soft good supply. The clamping device may be a component of the drive motor system includes a clamping device configured to transition between a clamped position and an open position. During a transition into the open position, a space between a pair of rollers of the drive motor system may be increased such that the soft good may readily pass between the pair of rollers (e.g., to facilitate feeding the soft good into the drive motor system). Once the soft good has been fed between the pair of rollers, the drive motor system may transition into the clamped position, thereby decreasing the space between the pair of rollers and securing (e.g., holding, clamping, etc.) the soft good in a dispensing position.

In some embodiments, step 106 includes measuring an amount of the soft good unwound from the bulk supply using a measurement device (e.g., measurement device 54). The measurement device may include one or more instruments operable to quantify an amount of the soft good fed by the drive motor system in order to determine when the desired quantity has been reached. The measurement device may include a weighing device, an optical scanner, or other suitable instruments for measuring an amount of the soft good unwound from the soft good supply. In some embodiments, the measurement device includes a weighing device built into the loading zone for the bulk soft good supply.

In some embodiments, step 106 includes providing a measurement signal representative of the measured amount of the soft good to the processing circuit. The processing circuit may receive the measurement signal from the measurement device, compare the measured amount of the soft good with the desired quantity of the soft good, and generate a control signal for the dispensing mechanism based on a result of the comparison. For example, the processing circuit may instruct the drive motor system to continue feeding the soft good supply until the desired quantity has been reached.

In some embodiments, step 106 includes using an automated cutting device of the dispensing mechanism (e.g., cutter 56) to separate the desired quantity of the soft good from a bulk supply. The cutting device may include a sharp instrument or other suitable device configured to separate (e.g., sever, detach, remove, cut, etc.) a portion of the soft good from the bulk supply. In some embodiments, the cutting device receives control signals from the processing circuit. The processing circuit may instruct the cutting device to perform a cutting operation in response to a determination by the processing circuit that the dispensing mechanism has unwound the desired quantity from the bulk supply.

Still referring to FIG. 12, process 100 is shown to include providing a dispensed quantity of the soft good to a dispensing zone (step 108). The dispensed quantity of the soft good may be the quantity of the soft good separated from the soft good supply in step 106. In some embodiments, the dispensing zone is a compartment or slot within the soft good dispensing device into which the dispensed quantity of the soft good is provided for user access when dispensing is completed. In other embodiments, the dispensing zone is a zone external to the soft good dispensing device. Upon completion of the dispensing process, a user can retrieve the dispensed quantity of the soft good from the dispensing zone.

Still referring to FIG. 12, in some embodiments process 100 includes facilitating payment for the dispensed quantity of the soft good (step 110). In some embodiments, step 110 includes receiving payment information. Payment information may be received via the user interface (e.g., by the user entering a credit card number, checking account number, customer identifier, etc.) or via a separate input device (e.g., input/output devices 30). For example, in some embodiments, the soft good dispensing system includes a card reader. The card reader may be configured to read and interpret data from a credit card, debit card, gift card, customer card, RFID card, memory card, or other portable data storage devices. The card reader may be used to quickly and easily input information without requiring a user to manually enter the information via the user interface.

In some embodiments, step 110 includes conducting electronic data communications with a payment processing system to facilitate payment for the dispensed quantity of the soft good. In various embodiments, the payment processing system may be a credit card processing system, a bank, an ATM network, a local store network, or other system to allow a user to pay for the dispensed quantity of the soft good directly at the dispensing device.

In some embodiments, step 110 includes printing a label (e.g., a sticker, a bar code, etc.) or other suitable indicia identifying the type and quantity of soft good dispensed. For embodiments in which direct purchase of the dispensed quantity is not performed at the soft good dispensing device, the output of the printer may be attached to dispensed quantity of the soft good (e.g., by a user, by the dispensing device, etc.) for subsequent check-out and purchase at a different location or time (e.g., at a main check-out location for the store).

Still referring to FIG. 12, in some embodiments, process 100 includes updating an amount of the soft good in an inventory database (step 112). Step 112 may include conducting electronic data communications with an inventory system (e.g., inventory system 46) using a data communications interface (e.g., communications interface 32). For example, the dispensing device may subtract the dispensed quantity of the soft good from a previously-recorded amount in the inventory database upon completion of the dispensing process. In some embodiments, step 112 include automatically initiating reorder instructions when a predetermined minimum quantity of the dispensed soft good is reached. Advantageously, automatically updating the inventory database and/or automatically initiating reorder instructions may further reduce the workload placed on store personnel.

The construction and arrangement of the systems and methods as shown in the various exemplary embodiments are illustrative only. Although only a few implementations of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, the dispensible materials of the present disclosure may encompass other materials beyond soft goods or soft lines. The dispensible material may also include other materials capable of being dispensed from a larger quantity (e.g. bulk supply), including but not limited to floor coverings, sheet goods, wires, cables, chains, and ropes.

Soft good dispensing device 10 may be a "stand-alone" or "universal" device intended for use with a variety of materials from a variety of sources or locations, or the device may be a "dedicated" device intended for use with a specific (or limited) number of materials or sources and may be integrated with such specific or limited materials or sources. Further, elements shown as integrally formed may be constructed of multiple parts or elements. The elements and assemblies may be constructed from any of a wide variety of materials that provide sufficient strength or durability, in any of a wide variety of colors, textures, and combinations.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for dispensing a soft good, the method comprising:
   receiving a soft good supply at a loading zone of a soft good dispensing device;
   receiving an indication of a desired quantity of the soft good at a processing circuit of the soft good dispensing device;
   using a dispensing mechanism of the soft good dispensing device to automatically dispense the desired quantity of the soft good from the soft good supply based on a control signal received from the processing circuit; and
   providing a dispensed quantity of the soft good to a dispensing zone of the soft good dispensing device for user access;
   wherein dispensing the desired quantity of the soft good supply comprises:
      using a stationary rotation guide having a curved surface to engage the soft good supply at an end of the loading zone; and
      rotating the soft good supply as a result of the soft good supply engaging the curved surface of the stationary rotation guide.

2. The method of claim 1, wherein the soft good comprises at least one of: fabric, lace, trim, ribbon, cording, elastic, foam, batting, stitching cloth, interfacing, plastic, vinyl, fur, felt, fleece, and fusible web.

3. The method of claim 1, wherein receiving the soft good supply comprises:
   receiving a bulk supply of the soft good within the loading zone, and automatically feeding the soft good into the dispensing mechanism from the bulk supply.

4. The method of claim 1, wherein automatically dispensing the desired quantity of the soft good comprises:
operating a drive motor system of the dispensing mechanism to unwind the soft good from a bulk supply;
measuring an amount of the soft good unwound from the bulk supply; and
providing a measurement signal to the processing circuit, wherein the measurement signal is representative of the measured amount of the soft good.

5. The method of claim 1, wherein automatically dispensing the desired quantity of the soft good comprises:
receiving, at the processing circuit, a measurement signal indicating a measured amount of the soft good unwound from a bulk supply;
comparing, by the processing circuit, the measured amount of the soft good with the desired quantity of the soft good; and
generating, by the processing circuit, a control signal for the dispensing mechanism based on a result of the comparison.

6. The method of claim 1, wherein automatically dispensing the desired quantity of the soft good comprises:
using an automated cutting device of the dispensing mechanism to separate the desired quantity of the soft good from a bulk supply in response to a determination, by the processing circuit, that the dispensing mechanism has unwound the desired quantity from the bulk supply.

7. The method of claim 1, further comprising:
receiving payment information from a user via at least one of: a user interface of the soft good dispensing device, and an input/output device of the soft good dispensing device; and
conducting electronic data communications with a payment processing system to facilitate payment for the dispensed quantity of the soft good.

8. The method of claim 1, further comprising:
conducting electronic data communications with an inventory system to automatically update an amount of the soft good in an inventory database,
wherein updating the amount of the soft good comprises subtracting the dispensed quantity of the soft good from a previously-recorded amount in the inventory database.

9. A system for dispensing a soft good, the system comprising:
a processing circuit configured to receive an indication of a desired quantity of a soft good;
a dispensing mechanism configured to receive a soft good supply and to automatically dispense the desired quantity of the soft good based on a control signal received from the processing circuit, wherein the dispensing mechanism comprises:
a pair of clamping rollers configured to clamp a free end of the soft good supply therebetween and to unwind the desired quantity of the soft good from the soft good supply by pulling the free end of the soft good supply; and
a third roller offset from the pair of clamping rollers and configured to guide the soft good supply to the pair of clamping rollers, wherein rotation of the third roller is driven by a rotation of at least one of the clamping rollers.

10. The system of claim 9, wherein the soft good comprises at least one of: fabric, lace, trim, ribbon, cording, elastic, foam, batting, stitching cloth, interfacing, plastic, vinyl, fur, felt, and fusible web.

11. The system of claim 9, further comprising:
a loading zone configured to receive a bulk supply of the soft good within the loading zone;
wherein the dispensing mechanism is configured to automatically feed the soft good from the bulk supply within the loading zone.

12. The system of claim 9, wherein the dispensing mechanism comprises:
a drive motor system configured to unwind the soft good from a bulk supply; and
a measurement device configured to measure an amount of the soft good unwound from the bulk supply and to provide a measurement signal to the processing circuit, the measurement signal indicating the measured amount of the soft good.

13. The system of claim 9, wherein the processing circuit is configured to:
receive a measurement signal indicating a measured amount of the soft good unwound from a bulk supply;
compare the measured amount of the soft good with the desired quantity of the soft good; and
generate a control signal for the dispensing mechanism based on a result of the comparison.

14. The system of claim 9, wherein the processing circuit is configured to determine whether the dispensing mechanism has unwound the desired quantity of the soft good from the bulk supply and to provide a control signal to the dispensing mechanism based on a result of the determination;
wherein the dispensing mechanism comprises an automated cutting device configured to separate the desired quantity of the soft good from the bulk supply upon receiving a control signal from the processing circuit.

15. The system of claim 9, further comprising:
a user interface configured to present information to a user and to receive a user selection of the desired quantity of the soft good.

16. The system of claim 9, further comprising:
one or more devices configured to receive payment information and to provide the payment information to the processing circuit, the one or more devices comprising at least one of: a user interface and an input/output device; and
a data communications interface configured to conduct electronic data communications with a payment processing system to facilitate payment for the dispensed quantity of the soft good.

17. The system of claim 9, further comprising:
a data communications interface configured to conduct electronic data communications with an inventory system to automatically update an amount of the soft good in an inventory database,
wherein updating the amount of the soft good comprises subtracting the dispensed quantity of the soft good from a previously-recorded amount in the inventory database.

18. A user-operable dispensing device for dispensing a desired quantity of a material from a larger bulk supply, the dispensing device comprising:
a loading zone configured to receive a bulk supply of the material therein, the loading zone comprising a scale configured to measure a weight of the material in the loading zone;
a user interface configured to receive a user selection of the desired quantity of the material;
a drive motor system configured to unwind the material from the bulk supply;
a measurement device configured to measure an amount of the material unwound from the bulk supply;

a cutting device configured to separate the desired quantity of the material from the bulk supply; and a dispensing zone configured to receive a dispensed quantity of the material separated from the bulk supply and to provide the dispensed quantity of the material to a user.

19. The dispensing device of claim 18, further comprising:
a processing circuit configured to compare the desired quantity of the material with the measured amount of the material unwound from the bulk supply and to control the drive motor system based on a result of the comparison.

20. The dispensing device of claim 18, further comprising:
a data communications interface configured to conduct electronic data communications with at least one of:
   a payment processing system to facilitate payment for the dispensed quantity of the material; and
   an inventory system to automatically update an amount of the material in an inventory database, wherein updating the amount of the material comprises subtracting the dispensed quantity of the material from a previously-recorded amount in the inventory database.

* * * * *